US007096947B2

(12) United States Patent
Todd et al.

(10) Patent No.: US 7,096,947 B2
(45) Date of Patent: Aug. 29, 2006

(54) FLUID LOSS CONTROL ADDITIVES FOR USE IN FRACTURING SUBTERRANEAN FORMATIONS

(75) Inventors: Bradley L. Todd, Duncan, OK (US); Billy F. Slabaugh, Duncan, OK (US); Trinidad Munoz, Jr., Duncan, OK (US); Mark A. Parker, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 224 days.

(21) Appl. No.: 10/765,334

(22) Filed: Jan. 27, 2004

(65) Prior Publication Data

US 2005/0161220 A1    Jul. 28, 2005

(51) Int. Cl.
*E21B 43/26*      (2006.01)
*E21B 43/267*     (2006.01)

(52) U.S. Cl. .................. 166/283; 166/281; 166/308.2; 507/211; 507/213; 507/216; 507/217; 507/267; 507/906; 507/922

(58) Field of Classification Search .............. 166/281, 166/282, 283, 308.2, 308.3, 308.4; 507/260, 507/267, 211, 213, 216, 217, 906, 922
See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Palmer ....................... 260/78.3 |
| 3,159,217 A * | 12/1964 | Hanson ....................... 166/260 |
| 3,173,484 A | 3/1965 | Huitt et al. ................ 166/280.1 |
| 3,195,635 A | 7/1965 | Fast ........................... 166/280.1 |
| 3,272,650 A | 9/1966 | MacVittie ..................... 134/7 |
| 3,302,719 A | 2/1967 | Fischer ..................... 166/280.2 |
| 3,319,716 A * | 5/1967 | Dill ............................. 166/282 |
| 3,364,995 A | 1/1968 | Atkins et al. ............. 166/280.1 |
| 3,366,178 A | 1/1968 | Malone et al. ........... 166/280.1 |
| 3,455,390 A | 7/1969 | Gallus ........................ 166/295 |
| 3,784,585 A | 1/1974 | Schmitt et al. ............. 260/861 |
| 3,819,525 A | 6/1974 | Hattenbrun ................. 252/132 |
| 3,828,854 A | 8/1974 | Templeton et al. ......... 166/307 |
| 3,868,998 A | 3/1975 | Lybarger et al. ............ 166/278 |
| 3,912,692 A | 10/1975 | Casey et al. ................ 260/78.3 |
| 3,948,672 A | 4/1976 | Harnsberger ................ 106/720 |
| 3,955,993 A | 5/1976 | Curtice et al. .............. 106/662 |
| 3,960,736 A | 6/1976 | Free et al. .............. 252/8.55 R |
| 3,968,840 A | 7/1976 | Tate ......................... 166/280.1 |
| 3,998,744 A | 12/1976 | Arnold et al. .............. 507/269 |
| 4,068,718 A | 1/1978 | Cooke, Jr. et al. ....... 166/280.2 |
| 4,169,798 A | 10/1979 | DeMartino ............. 252/8.55 R |
| 4,172,066 A | 10/1979 | Zweigle et al. ....... 260/29.6 TA |
| 4,387,769 A | 6/1983 | Erbstoesser et al. ........ 507/219 |
| 4,460,052 A | 7/1984 | Gockel ......................... 175/72 |
| 4,470,915 A | 9/1984 | Conway ................ 252/8.55 R |
| 4,498,995 A | 2/1985 | Gockel .................... 252/8.5 LC |
| 4,526,695 A | 7/1985 | Erbstoesser et al. ... 252/8.55 R |
| 4,694,905 A | 9/1987 | Armbruster ................. 166/280 |
| 4,715,967 A | 12/1987 | Bellis ....................... 252/8.551 |
| 4,716,964 A | 1/1988 | Erbstoesser et al. ........ 166/284 |
| 4,785,884 A | 11/1988 | Armbruster ................. 166/280 |
| 4,797,262 A | 1/1989 | Dewitz ....................... 422/142 |
| 4,809,783 A | 3/1989 | Hollenbeck et al. ........ 166/307 |
| 4,817,721 A | 4/1989 | Pober ......................... 166/295 |
| 4,843,118 A | 6/1989 | Lai et al. .................... 524/555 |
| 4,848,467 A | 7/1989 | Cantu et al. ................ 166/281 |
| 4,886,354 A | 12/1989 | Welch et al. ................. 356/70 |
| 4,957,165 A | 9/1990 | Cantu et al. ................ 166/295 |
| 4,961,466 A | 10/1990 | Himes et al. ............... 166/250 |
| 4,986,353 A | 1/1991 | Clark et al. ................. 166/279 |
| 4,986,354 A | 1/1991 | Cantu et al. ................ 166/279 |
| 4,986,355 A | 1/1991 | Casad et al. ................ 166/295 |
| 5,032,297 A | 7/1991 | Williamson et al. |
| 5,082,056 A | 1/1992 | Tackett, Jr. ................. 166/295 |
| 5,142,023 A | 8/1992 | Gruber et al. .............. 528/354 |
| 5,216,050 A | 6/1993 | Sinclair ...................... 524/108 |
| 5,247,059 A | 9/1993 | Gruber et al. .............. 528/354 |
| 5,249,628 A | 10/1993 | Surjaatmadja .............. 166/305 |
| 5,295,542 A | 3/1994 | Cole et al. .................. 166/278 |
| 5,325,923 A | 7/1994 | Surjaatmadja et al. ...... 166/308 |
| 5,330,005 A | 7/1994 | Card et al. .................. 166/280 |
| 5,359,026 A | 10/1994 | Gruber ....................... 528/354 |
| 5,360,068 A | 11/1994 | Sprunt et al. ............... 166/259 |
| 5,363,916 A | 11/1994 | Himes et al. ............... 166/276 |
| 5,373,901 A | 12/1994 | Norman et al. ............. 166/300 |
| 5,386,874 A | 2/1995 | Laramay et al. ............ 166/300 |
| 5,396,957 A | 3/1995 | Surjaatmadja et al. ...... 166/308 |
| 5,402,846 A | 4/1995 | Jennings, Jr. et al. ....... 166/259 |

(Continued)

FOREIGN PATENT DOCUMENTS

EP          0 510 762 A2     4/1992

(Continued)

OTHER PUBLICATIONS

Simmons, et al., "Poly(phenyllactide): Synthesis Characterization, and Hydrolytic Degradation," Biomacromolecules, vol. 2, No. 3, 2001 (pp. 658-663).

(Continued)

*Primary Examiner*—George Suchfield
(74) *Attorney, Agent, or Firm*—Robert A. Kent; Baker Botts

(57) ABSTRACT

The present invention relates to subterranean fracturing operations, and more particularly to fracturing fluids that includes a fluid loss control additive, and methods of using such fracturing fluids in fracturing subterranean formations. In one embodiment, a fracturing fluid of the present invention includes a viscosifier; and a fluid loss control additive that includes a deformable, degradable material.

21 Claims, No Drawings

U.S. PATENT DOCUMENTS

| | | | |
|---|---|---|---|
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,929,002 A * | 7/1999 | Joyce et al. | 507/211 |
| 5,964,291 A | 10/1999 | Bourne et al. | 166/279 |
| 5,981,447 A | 11/1999 | Chang et al. | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 * | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B1 | 12/2002 | Brothers et al. | 106/692 |
| 6,494,263 B1 | 12/2002 | Todd | 166/312 |
| 6,508,305 B1 | 1/2003 | Brannon et al. | 166/263 |
| 6,527,051 B1 | 3/2003 | Reddy et al. | 166/300 |
| 6,554,071 B1 | 4/2003 | Reddy, et al. | 166/293 |
| 6,569,814 B1 | 5/2003 | Brady et al. | 507/201 |
| 6,599,863 B1 | 7/2003 | Palmer et al. | 507/219 |
| 6,632,779 B1 | 10/2003 | Vollmer et al. | |
| 6,667,279 B1 | 12/2003 | Hessert et al. | 507/225 |
| 6,669,771 B1 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B1 | 7/2004 | Nguyen et al. | 166/278 |
| 6,763,888 B1 | 7/2004 | Harris et al. | 166/305.1 |
| 6,817,414 B1 | 11/2004 | Lee | 166/278 |
| 6,896,058 B1 * | 5/2005 | Munoz et al. | 166/279 |
| 6,949,491 B1 * | 9/2005 | Cooke, Jr. | 507/219 |
| 2001/0016565 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | |
| 2004/0152602 A1 | 8/2004 | Boles | 507/100 |
| 2004/0163814 A1 | 8/2004 | Tood et al. | |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini, et al. | 166/278 |
| 2005/0034865 A1 | 2/2005 | Todd, et al. | 166/304 |
| 2005/0034868 A1 | 2/2005 | Frost, et al. | 166/307 |
| 2005/0103496 A1 | 5/2005 | Todd et al. | 166/278 |
| 2005/0252659 A1 | 11/2005 | Sullivan et al. | 166/280.1 |
| 2005/0272613 A1 * | 12/2005 | Cooke, Jr. | 507/219 |

FOREIGN PATENT DOCUMENTS

| | | |
|---|---|---|
| EP | 0 879 935 A2 | 11/1998 |
| EP | 0 879 935 A3 | 10/1999 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 02/12674 A1 | 2/2002 |
| WO | WO 03/027431 | 4/2003 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |

OTHER PUBLICATIONS

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Cantu, et al, "Laboratory and Field Evaluation of a Combined Fluid-Loss-Control Additive and Gel Breaker for Fracturing Fluids," SPE Paper.18211 (1990).

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level I Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost Effective Method for Stimulatiing Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 09, 2004.

Blauch, et al, *Aqueous-Based Tackifier Fluids and Methods of Use*, U.S. Appl. No. 10/864,618, filed Jun. 9, 2004.

U.S. Appl. No. 10/650,101, filed Aug. 26, 2003, Todd et al.

U.S. Appl. No. 10/655,883, filed Sep. 5, 2003, Nguyen.

U.S. Appl. No. 10/661,173, filed Sep. 11, 2003, Todd et al.

U.S. Appl. No. 10/664,126, filed Sep. 17, 2003, Todd et al.

U.S. Appl. No. 10/736,152, filed Dec. 15, 2003, Todd.

Y. Chiang et al.: "Hydrolysis Of Ortho Esters: Further Investigation Of The Factors Which Control The Rate-Determining Step," Engineering Information Inc., NY, NY, vol. 105, No. 23 (XP-002322842).

M. Ahmad, et al.: "Ortho Ester Hydrolysis: Direct Evidence For A Three-Stage Reaction Mechanism," Engineering Information Inc., NY, NY, vol. 101, No. 10 (XP-002322843).

Foreign communication from a related counterpart application dated May 27, 2005.

Skrabal et al., *The Hydrolysis Rate Of Orthoformic Acid Ethyl Ether*, Chemical Institute of the University of Graz, pp. 1-38, Jan. 13, 1921.

Heller, et al., *Poly(ortho esters)—From Concept To Reality*, Biomarcromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release* 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful For Oilfield Applications*, Society of Petroleum Engineers, Inc., SPE 92709, Feb. 4, 2005.

* cited by examiner

FLUID LOSS CONTROL ADDITIVES FOR USE IN FRACTURING SUBTERRANEAN FORMATIONS

BACKGROUND OF THE INVENTION

The present invention relates to subterranean fracturing operations, and more particularly to fracturing fluids comprising an improved fluid loss control additive, and methods of using such fracturing fluids in fracturing subterranean formations.

Hydrocarbon-producing wells are often stimulated by hydraulic fracturing operations, wherein a viscous fracturing fluid is introduced into a hydrocarbon-producing zone within a subterranean formation at a hydraulic pressure sufficient to create or enhance at least one fracture therein. Generally, the fracturing fluid suspends proppant particles that are to be placed in the fractures to prevent the fractures from fully closing (once the hydraulic pressure is released), thereby forming conductive channels within the formation through which hydrocarbons can flow. Once at least one fracture is created and at least a portion of the proppant is substantially in place, the viscosity of the fracturing fluid may be reduced, to be removed from the formation.

In certain circumstances, a portion of the fracturing fluid may be lost during the fracturing operation, e.g., through undesirable leakoff into natural fractures present in the formation. This is problematic because such natural fractures often have higher stresses than fractures created by a fracturing operation. These higher stresses may damage the proppant and cause it to form an impermeable plug in the natural fractures, that may prevent hydrocarbons from flowing through the natural fractures.

Conventionally, operators have attempted to solve this problem by including a fluid loss control additive in the fracturing fluid. Conventional fluid loss control additives generally comprise rigid particles having a spheroid shape. The use of these additives can be problematic, inter alia, because such additives may require particles that have a distinct particle size distribution to achieve efficient fluid loss control. For example, when such additives are used to block the pore throats in the formation, a sufficient portion of relatively large particles will be required to obstruct the majority of the pore throat, and a sufficient portion of relatively small particles will also be required to obstruct the interstices between the large particles. Furthermore, for certain conventional fluid loss control additives, such a desired particle size distribution may be difficult to obtain without incurring the added expense of reprocessing the materials, for example, by cryogenically grinding them to achieve the desired particle size distribution.

SUMMARY OF THE INVENTION

The present invention relates to subterranean fracturing operations, and more particularly to fracturing fluids comprising an improved fluid loss control additive, and methods of using such fracturing fluids in fracturing subterranean formations.

An example of a method of the present invention is a method of fracturing a subterranean formation comprising the steps of: providing a fracturing fluid comprising a viscosifier and a fluid loss control additive that comprises a deformable, degradable material; and contacting the subterranean formation with the fracturing fluid so as to create or enhance at least one fracture therein.

Another example of a method of the present invention is a method of controlling fluid loss during fracturing of a subterranean formation, comprising the step of adding to a fracturing fluid a fluid loss control additive comprising a deformable, degradable material.

Another example of a method of the present invention is a method of minimizing fluid loss in a subterranean formation comprising using a fluid loss control additive comprising a deformable, degradable material to obstruct at least one pore throat in the formation.

An example of a composition of the present invention is a fracturing fluid comprising: a viscosifier; and a fluid loss control additive comprising a deformable, degradable material.

Another example of a composition of the present invention is a fluid loss control additive comprising a deformable, degradable material.

The features and advantages of the present invention will be readily apparent to those skilled in the art upon a reading of the description of the preferred embodiments, which follows.

DESCRIPTION OF EXEMPLARY EMBODIMENTS

The present invention relates to subterranean fracturing operations, and more particularly to fracturing fluids comprising a fluid loss control additive, and methods of using such fracturing fluids in fracturing subterranean formations. The fluid loss control additives of the present invention deform against the face of the subterranean formation. Generally, the fluid loss control additives of the present invention do not require a broad particle size distribution in order to provide a desirable degree of fluid loss control.

The improved fluid loss control additives of the present invention generally comprise a deformable, degradable material capable of undergoing an irreversible degradation downhole. As referred to herein, the term "irreversible" will be understood to mean that the deformable, degradable material, once degraded, should not recrystallize or reconsolidate while downhole, e.g., the deformable, degradable material should degrade in situ, but should not recrystallize or reconsolidate in situ. The term "degradation" or "degradable" refers to both the two relatively extreme cases of hydrolytic degradation that the deformable, degradable material may undergo (e.g., bulk erosion or surface erosion), and any stage of degradation in between these two. This degradation can be a result of, inter alia, a chemical or thermal reaction, an enzymatic degradation, or a reaction induced by radiation. As referred to herein, the term "deformable" will be understood to mean that the material deforms (by either plastic or elastic deformation) under the differential pressure between the pore throat pressure (the pressure exerted on a subterranean well bore by fluids within the formation) and the fracture pressure (the pressure that will fracture the formation). When a fracturing fluid comprising a fluid loss control additive of the present invention is placed in a subterranean formation, the fluid loss control additive deforms to cover the pore throats of the subterranean formation. Generally, the fluid loss control additive is present in the fracturing fluids of the present invention in an amount sufficient to provide a desired degree of fluid loss control. More particularly, the fluid loss control additive is present in the fracturing fluids of the present invention in an amount in the range of from about 0.01% to about 2% by weight of the fracturing fluid. In certain preferred embodiments, the fluid loss control additive is present in the fracturing fluids of the present invention in an amount in the range of from about 0.2% to about 0.7% by weight of the fracturing fluid. The fluid loss control additive of the present invention will generally have a particle size distribution ranging from about 1 micron to about 1,000 microns. In certain preferred embodiments, the fluid loss control additive of the present invention will have a particle size distribution ranging from about 100 microns to about 850 microns, with a median particle size of about 200 microns.

In certain exemplary embodiments, the deformable, degradable material may comprise a mixture of a degradable material and a hydrated organic or inorganic solid compound. For example, an operator may encounter circumstances requiring the presence of water in the subterranean formation to facilitate the degradation of the deformable, degradable material. In such circumstances, a desirable choice for a fluid loss control additive may be embodiments of deformable, degradable materials comprising a mixture of a degradable material and a hydrated organic or inorganic solid compound. In an exemplary embodiment of the present invention, the deformable, degradable material may degrade in the water provided by the hydrated organic or inorganic compound, which dehydrates over time when heated in the subterranean zone. In another exemplary embodiment of the present invention, the presence of the hydrated organic or inorganic solid compound in the deformable, degradable material may desirably facilitate deformation of the fluid loss control additives of the present invention in order to obstruct pores in the subterranean formation, without extruding into them. Examples of such hydrated organic or inorganic compounds include, but are not limited to, sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic polymers, or cellulose-based hydrophilic polymers.

In an exemplary embodiment, the deformable, degradable material is a degradable polymer. A polymer is considered to be "degradable" herein if the degradation is due to, inter alia, chemical and/or radical process, e.g., such as hydrolysis, oxidation, enzymatic degradation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on factors such as, inter alia, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer degrades also may be affected by the environment to which the polymer is exposed, e.g., temperature, presence of moisture, oxygen, microorganisms, enzymes, pH, and the like.

Suitable examples of degradable polymers that may be used in accordance with the present invention include, but are not limited to, those described in the publication of Advances in Polymer Science, Vol. 157 entitled "Degradable Aliphatic Polyesters," edited by A. C. Albertsson. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Exemplary polymers suitable for use in the present invention include polysaccharides such as dextran or cellulose; chitin; chitosan; proteins; aliphatic polyesters; poly(lactide); poly(glycolide); poly(ϵ-caprolactone); poly(hydroxybutyrate); poly (anhydrides); aliphatic polycarbonates; poly(orthoesters); poly(amino acids); poly(ethylene oxide); and polyphosphazenes. In certain exemplary embodiments of the present invention wherein the deformable, degradable material is a degradable polymer, the degradable polymer is an aliphatic polyester or a polyanhydride.

Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis" and is thought to make polyester matrices more bulk-eroding.

Suitable aliphatic polyesters have the general formula of repeating units shown below:

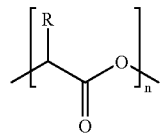

formula I where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly (lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to writ of formula I without any limitation as to how the polymer was made such as from lactides, lactic acid, or oligomers, and without reference to the degree of polymerization or level of plasticization.

The lactide monomer exists generally in three different forms: two stereoisomers (L- and D-lactide) and racemic D,L-lactide (meso-lactide). The oligomers of lactic acid and the oligomers of lactide are defined by the formula:

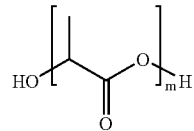

formula II where m is an integer: $2 \leq m \leq 75$. Preferably m is an integer: $2 \leq m \leq 10$. These limits may correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the deformable, degradable material is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined in accordance with the present invention. Additionally, they may be copolymerized with, for example, glycolide or other monomers like ϵ-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters. In embodiments wherein polylactide is used as the degradable material, certain preferred embodiments employ a mixture of the D and L stereoisomers, designed so as to provide a desired degradation time and/or rate.

Plasticizers may be present in the polymeric deformable, degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include but are not limited to derivatives of oligomeric lactic acid, selected from the group defined by the formula:

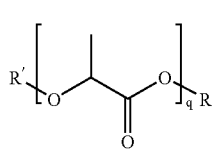

formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer; $2 \leq q \leq 75$; and mixtures thereof. Preferably q is an integer; $2 \leq q \leq 10$. As used herein, the term "derivatives of oligomeric lactic acid" includes derivatives of oligomeric lactide. In addition to the other qualities above, the plasticizers may enhance the degradation rate of the degradable polymeric materials.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of particularly suitable degradable polymers useful in the present invention. Polyanhydride hydrolysis proceeds, inter alia, via free carboxylic acid chain-ends to yield carboxylic acids as final degradation products. Their erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

The physical properties of degradable polymers may depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyperbranched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

In choosing the appropriate deformable, degradable material, one should consider the degradation products that will result. Also, these degradation products should not adversely affect other operations or components. The choice of deformable, degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range.

In certain exemplary embodiments, the degradation of the deformable, degradable material could result in a final degradation product having the potential to affect the pH of the fracturing fluid. For example, in exemplary embodiments wherein the deformable, degradable material is poly(lactic acid), the degradation of the poly(lactic acid) to produce lactic acid may alter the pH of the fracturing fluid. In certain exemplary embodiments, a buffer compound may be included within the fracturing fluids of the present invention in an amount sufficient to neutralize the final degradation product. Examples of suitable buffer compounds include, but are not limited to, calcium carbonate, magnesium oxide, ammonium acetate, and the like. One of ordinary skill in the art, with the benefit of this disclosure, will be able to identify the proper concentration of a buffer compound to include in the fracturing fluid for a particular application. An example of a suitable buffer comprises ammonium acetate and is commercially available from Halliburton Energy Services, Inc., under the trade name "BA-20."

Also, we have found that a preferable result is achieved if the deformable, degradable material degrades slowly over time as opposed to instantaneously. Even more preferable results have been obtained when the deformable, degradable material does not begin to degrade until after the proppant has been placed in the fracture. The slow degradation of the deformable, degradable material helps, inter alia, to provide fluid loss control during proppant placement.

The fracturing fluids of the present invention generally comprise a base fluid, a viscosifier, and a fluid loss control additive that comprises a deformable, degradable material. A variety of base fluids may be included in the fracturing fluids of the present invention. For example, the base fluid may be water, oil, or a mixture thereof. Generally, the base fluid is present in the fracturing fluids of the present invention in an amount in the range of from about 30% to about 99% by weight of the fracturing fluid.

The fracturing fluids of the present invention comprise a viscosifier. Examples of suitable viscosifiers include, inter alia, biopolymers such as xanthan and succinoglycan, cellulose derivatives (e.g., hydroxyethylcellulose), and guar and its derivatives (e.g., hydroxypropyl guar). In certain exemplary embodiments of the present invention, the viscosifier is guar. Generally, the viscosifier is present in the fracturing fluids of the present invention in an amount sufficient to transport the proppant to the fracture. More particularly, the viscosifier is present in the fracturing fluids of the present invention in an amount in the range of from about 0.01% to about 1.0% by weight of the fracturing fluid. In certain exemplary embodiments, the viscosifier is present in the fracturing fluid in an amount in the range of from about 0.2% to about 0.6% by weight.

Optionally, the fracturing fluids of the present invention may comprise additional additives as deemed appropriate by one skilled in the art for improving the performance of the fracturing fluid with respect to one or more properties. Examples of such additives include, but are not limited to, a de-emulsifier, a salt, a crosslinking agent, a clay inhibitor, a proppant, an acid, a breaker, a bactericide, caustic, or the like. An example of a suitable de-emulsifier is commercially available from Halliburton Energy Services, Inc., under the trade name "LO-SURF 300." An example of a suitable source of caustic is commercially available from Halliburton Energy Services, Inc., under the trade name "MO-67." An example of a suitable crosslinking agent is commercially available from Halliburton Energy Services, Inc., under the trade name "CL-28M." An example of a suitable breaker is commercially available from Halliburton Energy Services, Inc., under the trade name "VICON NF." Examples of suitable bactericides are commercially available from Halliburton Energy Services, Inc., under the trade names "BE-3S" and "BE-6."

An example of a method of the present invention is a method of fracturing a subterranean formation comprising the steps of: providing a fracturing fluid comprising a viscosifier and a fluid loss control additive that comprises a deformable, degradable material; and contacting the subterranean formation with the fracturing fluid so as to create or enhance at least one fracture therein. Additional steps could include, inter alia, recovering the fracturing fluid from the subterranean formation. Another example of a method of the present invention is a method of controlling fluid loss during fracturing of a subterranean formation, comprising the step of adding to a fracturing fluid a fluid loss control additive comprising a deformable, degradable material. Another example of a method of the present invention is a method of minimizing fluid loss in a subterranean formation comprising using a fluid loss control additive comprising a deformable, degradable material to obstruct at least one pore throat in the formation.

One example of a fracturing fluid composition of the present invention is a fracturing fluid comprising: water, 1% potassium chloride by weight, 0.05% LO-SURF 300 by weight, 0.15% of a fluid loss control additive of the present invention by weight, 0.2% guar by weight, 0.005% BA-20 by weight, 0.1% MO-67 by weight, 0.05% CL-28M by weight, 0.1% VICON NF by weight, 0.001% BE-3S by weight, 0.001% BE-6 by weight, and 50% fracturing sand by weight.

Therefore, the present invention is well adapted to carry out the objects and attain the ends and advantages mentioned as well as those that are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

We claim:

1. A method of fracturing a subterranean formation comprising the steps of:
   providing a fracturing fluid comprising a viscosifier and a fluid loss control additive that comprises a deformable, degradable material, wherein the deformable degradable material is selected from the group consisting of, chitins, chitosans, proteins, poly($\epsilon$-caprolactones), poly(hydroxybutyrates), polyanhydrides, aliphatic polycarbonates, poly(orthoesters), poly(amino acids), poly(ethylene oxides), poly(phosphazenes), and combinations thereof; and
   contacting the formation with the fracturing fluid so as to create or enhance at least one fracture therein.

2. The method of claim 1 further comprising the step of removing the fracturing fluid from the subterranean formation.

3. The method of claim 1 wherein the deformable, degradable material is a poly(orthoester).

4. The method of claim 1 wherein the deformable, degradable material has a particle size distribution in the range of from about 1 micron to about 1,000 microns.

5. The method of claim 1 wherein the deformable, degradable material has a particle size distribution in the range of from about 100 microns to about 850 microns.

6. The method of claim 1 wherein the deformable, degradable material has a median particle size of about 200 microns.

7. The method of claim 1 wherein the fluid loss control additive comprising the deformable, degradable material is present in the fracturing fluid in an amount in the range of from about 0.01% to about 2% by weight of the fracturing fluid.

8. The method of claim 1 wherein the deformable, degradable material further comprises a hydrated organic or inorganic solid compound.

9. The method of claim 8 wherein the fluid loss control additive comprising the deformable, degradable material deforms to obstruct pores in the formation.

10. The method of claim 8 wherein the hydrated organic or inorganic solid compound is selected from the group consisting of sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic, polymers, cellulose-based hydrophilic polymers, and mixtures thereof.

11. The method of claim 1 wherein the fracturing fluid further comprises a base fluid.

12. The method of claim 11 wherein the base fluid is water, oil, or a mixture thereof.

13. The method of claim 11 wherein the base fluid is present in the fracturing fluid in an amount in the range of from about 30% to about 99% by weight of the fracturing fluid.

14. The method of claim 1 wherein the viscosifier comprises a material selected from the group consisting of biopolymers, cellulose derivatives, and mixtures thereof.

15. The method of claim 14 wherein the biopolymer is selected from the group consisting of xanthan, succinoglycan, and mixtures thereof.

16. The method of claim 14 wherein the cellulose derivative is selected from the group consisting of hydroxyethylcellulose, guar, derivatives, and mixtures thereof.

17. The method of claim 16 wherein the guar derivative is hydroxypropyl guar.

18. The method of claim 1 wherein the viscosifier is present in the fracturing fluid in an amount in the range of from about 0.01% to about 1.0% by weight of the fracturing fluid.

19. The method of claim 1 wherein the fracturing fluid further comprises a buffer compound.

20. The method of claim 19 wherein the buffer compound is calcium carbonate, ammonium acetate, or magnesium oxide.

21. The method of claim 1 wherein the fracturing fluid further comprises an additive selected from the group consisting of de-emulsifiers, salts, crosslinking agents, clay inhibitors, proppants, acids, breakers, bactericides, caustics, and mixtures thereof.

* * * * *